(12) United States Patent
Kaiser et al.

(10) Patent No.: US 7,592,071 B2
(45) Date of Patent: Sep. 22, 2009

(54) LAYER SYSTEM

(75) Inventors: Axel Kaiser, Neuss (DE); Eckart Schumann, Mülheim an der Ruhr (DE); Ramesh Subramanian, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 635 days.

(21) Appl. No.: 11/396,419

(22) Filed: Mar. 31, 2006

(65) Prior Publication Data

US 2006/0286401 A1    Dec. 21, 2006

(30) Foreign Application Priority Data

Apr. 1, 2005    (EP)    ................... 05007225

(51) Int. Cl.
 *B32B 9/00*    (2006.01)
(52) U.S. Cl. .................. 428/469; 428/472; 428/702; 416/241 B
(58) Field of Classification Search .............. None
See application file for complete search history.

(56) References Cited

U.S. PATENT DOCUMENTS

| | | | |
|---|---|---|---|
| 5,035,957 A | 7/1991 | Bartlett et al. | |
| 5,599,385 A | 2/1997 | Czech et al. | |
| 6,024,792 A | 2/2000 | Kurz et al. | |
| 6,258,467 B1 * | 7/2001 | Subramanian | 428/633 |
| 6,365,281 B1 | 4/2002 | Subramanian et al. | |
| 6,387,539 B1 * | 5/2002 | Subramanian | 428/633 |
| 2001/0007719 A1 | 7/2001 | Maloney | |
| 2004/0180233 A1 | 9/2004 | Stamm | |

FOREIGN PATENT DOCUMENTS

| | | |
|---|---|---|
| CA | 2529781 A1 | 12/2005 |
| EP | 0 412 397 B1 | 2/1991 |
| EP | 0 486 489 B1 | 5/1992 |
| EP | 0 786 017 B1 | 7/1997 |
| EP | 0 848 077 A1 | 6/1998 |
| EP | 0 892 090 A1 | 1/1999 |
| EP | 0 944 746 B1 | 9/1999 |
| EP | 0 992 603 A1 | 4/2000 |
| EP | 1122329 A1 | 8/2001 |
| EP | 1 204 776 B1 | 5/2002 |
| EP | 1 306 454 A1 | 5/2003 |
| EP | 1 319 729 A1 | 6/2003 |
| EP | 1 319 730 A1 | 6/2003 |
| EP | 1 514 953 A2 | 3/2005 |
| EP | 1 666 627 A2 | 6/2006 |
| EP | 1707653 A1 | 10/2006 |
| WO | WO 99/67435 A1 | 12/1999 |
| WO | WO 00/44949 A1 | 8/2000 |

OTHER PUBLICATIONS

T. Kato, Y. Iijima, T. Muroga, T. Saitoh, T. Hirayama, I. Hirabayashi, Y. Yamada, T. Izumi, Y. Shiohara, Y. Ikuhara, "TEM observations of $Gd_2Zr_2O_7$ films formed by the ion-beam-assisted deposition method on an Ni-based alloy", PHYSICA C, 2003, pp. 790-795, , vol. 392-396XP-002356325.

* cited by examiner

*Primary Examiner*—Timothy M Speer

(57) ABSTRACT

Thermal barrier coating layer systems, in addition to good thermal barrier properties, also have to have a long service life of the thermal barrier coating. The layer system according to the invention comprises a specially adapted layer sequence of metallic bonding layer, inner ceramic layer and outer ceramic layer.

10 Claims, 2 Drawing Sheets

LAYER SYSTEM

CROSS REFERENCE TO RELATED APPLICATIONS

This application claims the benefits of European Patent application No. 05007225.5 filed Apr. 1, 2005 and is incorporated by reference herein in its entirety.

FIELD OF THE INVENTION

The invention relates to a layer system as described in the claims.

BACKGROUND OF THE INVENTION

A layer system of this type has a substrate comprising a metal alloy based on nickel, cobalt or iron. Products of this type are used in particular as components of a gas turbine, in particular as gas turbine blades or vanes or heat shields. The components are exposed to a hot-gas stream of aggressive combustion gases, and consequently they have to be able to withstand high thermal stresses. Furthermore, it is necessary for these components to be resistant to oxidation and corrosion. Furthermore, mechanical demands are imposed in particular on moving components, for example gas turbine blades or vanes, but also on static parts. The power and efficiency of a gas turbine in which components that can be exposed to hot gases are used rise with an increasing operating temperature. To achieve a high efficiency and a high power, components of the gas turbines which are subject to particularly high stresses from the high temperatures are coated with a ceramic material. This ceramic material acts as a thermal barrier coating between the hot-gas stream and the metallic substrate.

The metallic base body is protected from the aggressive hot-gas stream by coatings. Modern components generally have a plurality of coatings which each perform specific tasks. Therefore, a multilayer system is present.

Since power and efficiency of gas turbines rise with increasing operating temperature, constant attempts have been made to achieve a higher gas turbine performance by improving the coating system.

EP 0 944 746 B1 discloses the use of pyrochlores as thermal barrier coating.

However, to be used as material for a thermal barrier coating, it is necessary for materials not only to have good thermal barrier properties but also good bonding to the substrate.

EP 0 992 603 A1 discloses a thermal barrier coating system comprising gadolinium oxide and zirconium oxide, which is not supposed to have a pyrochlore structure.

SUMMARY OF THE INVENTION

Therefore, it is an object of the invention to provide a layer system which has good thermal barrier properties and good bonding to the substrate and therefore provides a long service life of the overall layer system.

The invention is based on the discovery that the entire system has to be considered as a single unit, rather than regarding and optimizing individual layers or combinations of individual layers in isolation, with a view to achieving a long service life.

The object is achieved by the layer system as claimed in the claims.

The subclaims list further advantageous measures which can be combined in any desired, advantageous way.

DETAILED DESCRIPTION OF THE INVENTION

Figure 1:
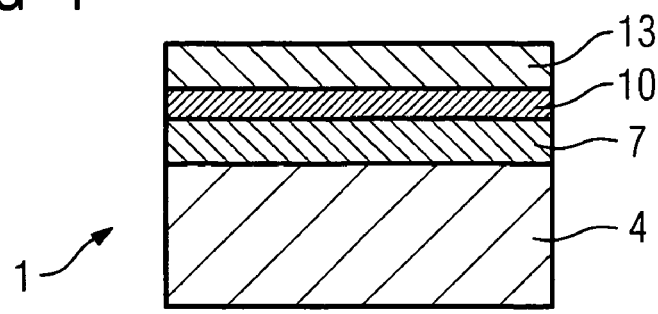
FIG. 1 shows a layer system according to the invention.

FIG. 1 shows a layer system 1 according to the invention.

The layer system 1 comprises a metallic substrate 4, which in particular for components used at high temperatures consists of a nickel-base or cobalt-base superalloy.

Directly on the substrate 4 there is a metallic bonding layer 7, which consists either of 11-13 wt % cobalt, 20-22 wt % chromium, 10.5-11.5 wt % aluminum, 0.3-0.5 wt % yttrium, 1.5-2.5 wt % rhenium, remainder nickel, or 24-26 wt % cobalt, 16-18 wt % chromium, 9.5-11 wt % aluminum, 0.3-0.5 wt % yttrium, 0.5-2 wt % rhenium, remainder nickel.

Even before the application of further ceramic layers, an aluminum oxide layer has formed on this metallic bonding layer 7, or an aluminum oxide layer of this type is formed during operation.

A fully or partially stabilized zirconium oxide layer is present as inner ceramic layer 10 on the metallic bonding layer 7 or on the aluminum oxide layer (not shown). It is preferable to use yttrium-stabilized zirconium oxide. It is also possible to use calcium oxide, cerium oxide or hafnium oxide to stabilize zirconium oxide.

The zirconium oxide is preferably applied as a plasma-spray layer, but also may be applied as a columnar structure by means of electron beam physical vapor deposition.

An outer ceramic layer 13, which mostly comprises a pyrochlore phase, i.e. is made up to an extent of at least 80 wt % of the pyrochlore phase and comprises $Gd_2Hf_2O_7$ or $Gd_2Zr_2O_7$, has been applied to the stabilized zirconium oxide layer 10. It is preferable for the outer layer 13 to consist of 100 wt % of one of the two pyrochlore phases.

Amorphous phases or pure $GdO_2$ or pure $ZrO_2$ or pure $HfO_2$ have been disregarded. Mixed phases of $GdO_2$ and $ZrO_2$ and/or $HfO_2$ which do not comprise the pyrochlore phase are undesirable and should be minimized.

The crucial factor in the invention is the discovery that not only does the interaction between the outer ceramic layer 13 and an inner ceramic layer 10 need to be optimized, but also the metallic bonding layer 7 has a significant influence on the service life and function of the outer ceramic layer 13 of this two-layer ceramic structure.

Figure 2:
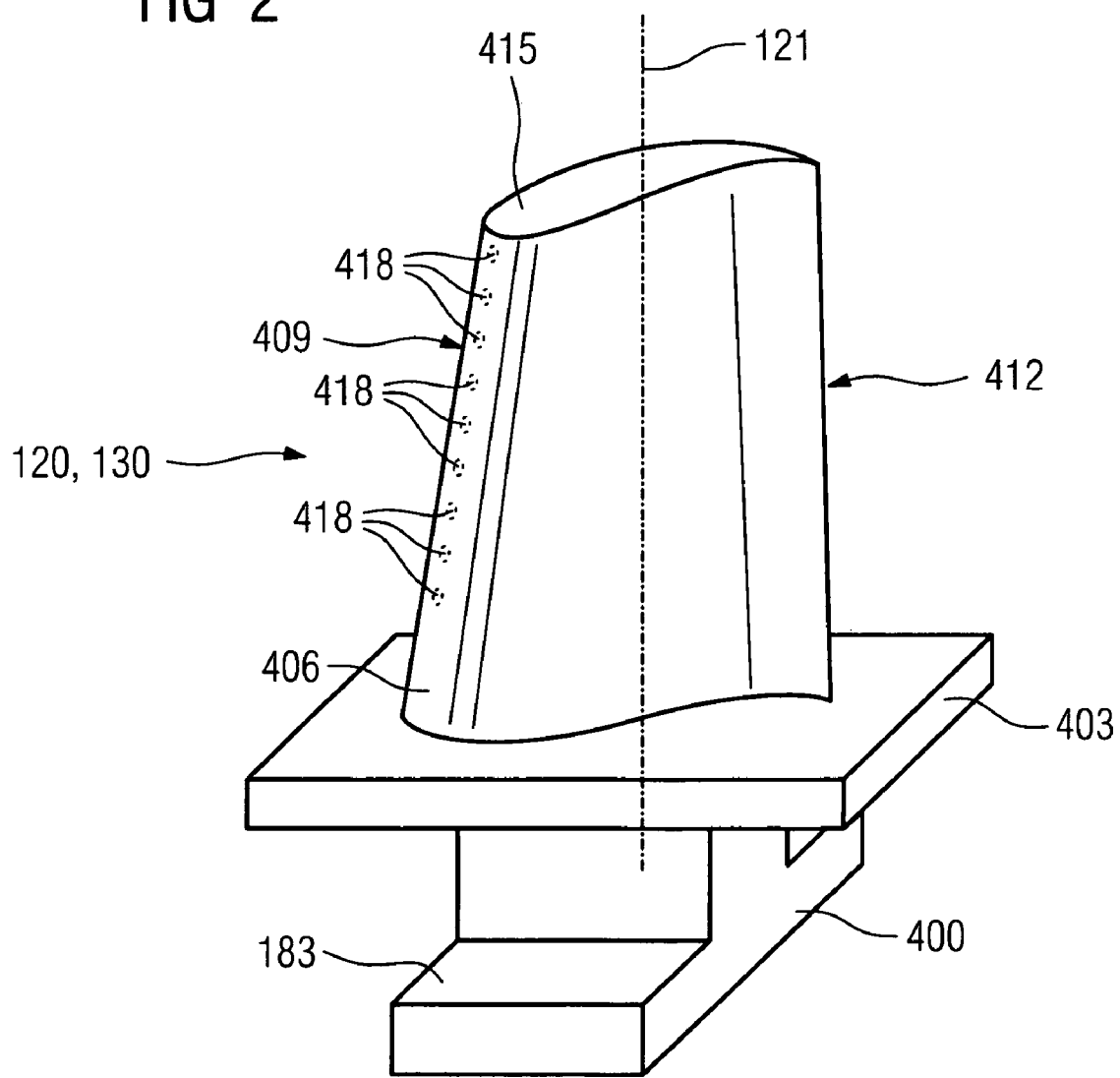
FIG. 2 shows a turbine blade or vane.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations as a fir-tree root or dovetail root are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1; these documents form part of the present disclosure.

The blades or vanes 120, 130 may also have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

There may also be a thermal barrier coating consisting, for example, of $ZrO_2$, $Y_2O_4$—$ZrO_3$, i.e. unstabilized, partially stabilized or fully stabilized by yttrium oxide and/or calcium oxide and/or magnesium oxide, on the MCrAlX. Columnar grains are produced in the thermal barrier coating by suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (illustrated in dashed lines).

Figure 3:
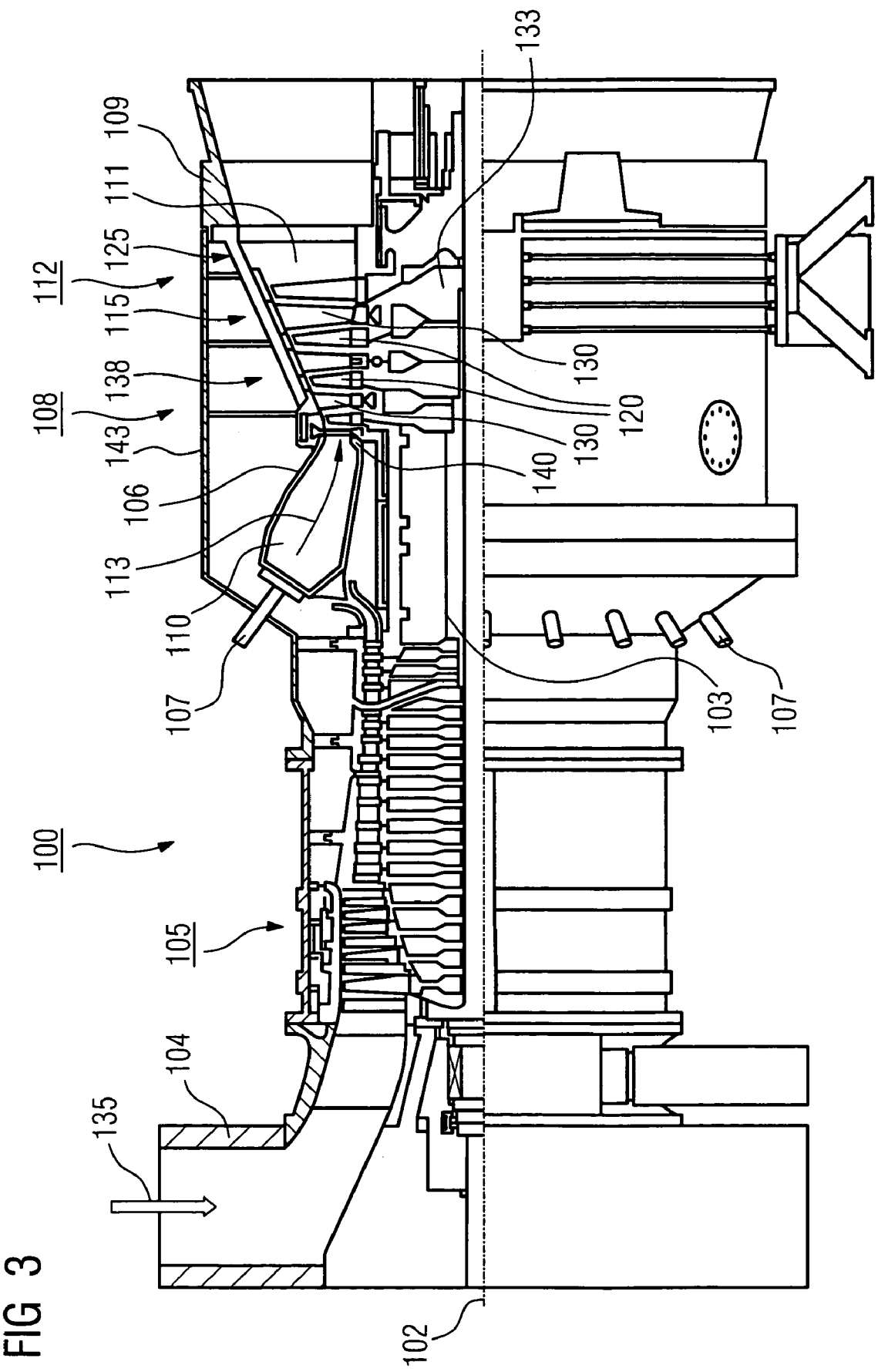
FIG. 3 shows a gas turbine.

FIG. 3 shows, by way of example, a partial longitudinal section through a gas turbine 100.

In the interior, the gas turbine 100 has a rotor 103 which is mounted such that it can rotate about an axis of rotation 102 and has a shaft 101 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113 together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element and/or hafnium).

Alloys of this type are known from EP 0 486 489 B1, EP 0 786 017 B1, EP 0 412 397 B1 or EP 1 306 454 A1, which are intended to form part of the present disclosure with regard to the chemical composition.

A thermal barrier coating may also be present on the MCrAlX, consisting, for example, of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

List of Designations
1 Layer system
Substrate
Bonding layer
Inner ceramic layer
Outer ceramic layer
Gas turbine
Axis of rotation
Rotor
Intake housing
Compressor
Annular combustion chamber
Burner
Turbine
Exhaust-gas housing
Combustion chamber
Hot-gas passage
Turbine stage
Working medium
Row of guide vanes
Rotor blade
Longitudinal axis
Row
Guide vane
Turbine disk
Air
Inner housing
Securing ring
Stator
Combustion chamber wall
Heat shield element
Blade or vane root
Securing region
Blade or vane platform
Main blade or vane part
Leading edge
Trailing edge
Blade or vane tip
Film-cooling holes

The invention claimed is:

1. A layer system adapted for use in a high temperature environment, comprising:
    a substrate;
    a metallic bond layer arranged on the substrate comprising:
        24-26 wt % cobalt,
        16-18 wt % chromium,
        9.5-11 wt % aluminum,
        0.3-0.5 wt % yttrium,
        0.5-2 wt % rhenium, and
        remainder nickel;
    a yttrium-stabilized zirconium oxide inner ceramic layer arranged on the bond layer; and
    an outer ceramic layer arranged on the inner ceramic layer comprising:
        80 wt % of a $Gd_2Zr_2O_7$ pyrochlore.

2. The layer system as claimed in claim 1, wherein the layer system consists essentially of: the substrate, the metallic bond layer, the inner ceramic layer and the outer ceramic layer.

3. The layer system as claimed in claim 1, wherein the outer ceramic layer comprises 100 wt % of the $Gd_2Zr_2O_7$ pyrochlore.

4. The turbine blade or vane claimed in claim 1, wherein the substrate has a single crystal structure.

5. A high temperature coated turbine component, comprising:
    a substrate formed from a nickel-based or cobalt-based super alloy;
    a metallic bond layer arranged on the substrate comprising:
        11-13 wt % cobalt,
        20-22 wt % chromium,
        10.5-11.5 wt % aluminum,
        0.3-0.5 wt % yttrium,
        1.5-2.5 wt % rhenium, and
        remainder nickel;
    a yttrium-stabilized zirconium oxide inner ceramic layer arranged on the bond layer; and
    an outer ceramic layer arranged on the inner ceramic layer comprising:
        80 wt % of a $Gd_2Hf_2O_7$ pyrochlore.

6. The coated turbine component claimed in claim 5, wherein the coated turbine component consists essentially of: the substrate, the metallic bond layer, the inner ceramic layer and the outer ceramic layer.

7. The coated turbine component claimed in claim 5, wherein the outer ceramic layer comprises 100 wt % of the $Gd_2Hf_2O_7$ pyrochlore.

8. The turbine blade or vane claimed in claim 5, wherein the high temperature coated turbine component is a blade or vane.

9. The coated turbine component claimed in claim 8, wherein the superalloy substrate has a single crystal structure.

10. The coated turbine component claimed in claim 5, wherein the yttrium-stabilized zirconium oxide inner ceramic layer is applied via a plasma-spray or an electron beam physical vapor deposition process.

* * * * *